(12) United States Patent
Alford

(10) Patent No.: US 12,065,962 B2
(45) Date of Patent: Aug. 20, 2024

(54) GAS STORAGE APPARATUS AND METHOD

(71) Applicant: INNOVATIUM LLP, Windsor (GB)

(72) Inventor: Adrian Alford, Windsor (GB)

( * ) Notice: Subject to any disclaimer, the term of this patent is extended or adjusted under 35 U.S.C. 154(b) by 977 days.

(21) Appl. No.: 17/286,656

(22) PCT Filed: Oct. 17, 2018

(86) PCT No.: PCT/GB2018/052987
§ 371 (c)(1),
(2) Date: Apr. 19, 2021

(87) PCT Pub. No.: WO2019/077343
PCT Pub. Date: Apr. 25, 2019

(65) Prior Publication Data
US 2021/0372322 A1   Dec. 2, 2021

(30) Foreign Application Priority Data

Oct. 17, 2017 (GB) ...................... 1717040

(51) Int. Cl.
*F02C 1/02* (2006.01)
*F17C 1/00* (2006.01)
*F25J 1/00* (2006.01)

(52) U.S. Cl.
CPC .............. *F02C 1/02* (2013.01); *F17C 1/00* (2013.01); *F25J 1/0012* (2013.01); *F05D 2260/20* (2013.01); *F17C 2205/0323* (2013.01); *F17C 2221/031* (2013.01); *F17C 2223/0123* (2013.01); *F17C 2225/013* (2013.01); *F17C 2227/036* (2013.01); *F17C 2227/0362* (2013.01); *F17C 2270/0581* (2013.01); *F25J 2290/62* (2013.01)

(58) Field of Classification Search
CPC ...................................... F25J 1/0012
See application file for complete search history.

(56) References Cited

U.S. PATENT DOCUMENTS

2015/0192330 A1* 7/2015 Alekseev ............ F25J 3/04593
62/6
2017/0016577 A1* 1/2017 Sinatov .................... F25J 1/004

FOREIGN PATENT DOCUMENTS

| CN | 102173931 B | 1/2014 | |
|---|---|---|---|
| CN | 105352265 | 2/2016 | |
| CN | 105352265 A * | 2/2016 | ............ F25J 1/0012 |
| CN | 205364600 U | 7/2016 | |
| CN | 106316021 A | 1/2017 | |
| CN | 107060921 A * | 8/2017 | ............ F01K 13/02 |
| DE | 19947846 A1 | 4/2001 | |
| EP | 0894030 B1 | 3/2001 | |
| EP | 1064106 B1 | 7/2003 | |

(Continued)

*Primary Examiner* — Thomas E Lazo
(74) *Attorney, Agent, or Firm* — Walker Griffin Weitzel; Alloy Patent Law

(57) ABSTRACT

The present invention relates to a gas storage apparatus and method, and more specifically to liquid air energy storage and its use to facilitate both Demand Side Reduction (DSR) and the use of reduced-cost electricity by industrial compressed-air users. A related electricity generating apparatus and method is also disclosed. The apparatus and method use a first sensible heat coolth store and second latent heat coolth store to first reduce the gas in temperature and then to change it into a liquid phase. Coolth top up devices are also disclosed.

23 Claims, 11 Drawing Sheets

(56) References Cited

FOREIGN PATENT DOCUMENTS

| | | | | |
|---|---|---|---|---|
| ES | 2190856 A1 | 4/2005 | | |
| GB | 301105 A | 11/1928 | | |
| GB | 951520 A | 3/1964 | | |
| GB | 2537125 A | * 10/2016 | ............... | F02C 6/14 |
| JP | 6183388 A | 4/1986 | | |
| KR | 200162443 Y1 | 12/1999 | | |
| KR | 200406313 Y1 | 1/2006 | | |
| KR | 101458499 B1 | 11/2014 | | |

* cited by examiner

GAS STORAGE APPARATUS AND METHOD

FIELD OF THE INVENTION

The present invention relates to a gas storage apparatus and method, and more specifically to liquid air energy storage and its use to facilitate both Demand Side Response (DSR) and time shifting electricity demand to enable the use of reduced-cost electricity by industrial compressed-air users. A related electricity generating apparatus and method is also disclosed.

This is achieved by the use of a system which takes compressed air provided by a shop air system and converts it to pressurized liquid air for storage during times when electricity is at reduced cost, such as at times when demand is low or when renewable electricity supply is greater than demand. At times when electricity costs are high due to high demand or low renewables supply, compressed air can be provided by the system, allowing shop air compressors to be turned off. The input and output of compressed air as opposed to electricity reduces the compression and expansion processes by approximately a factor of 2 and reduces the round-trip losses and energy storage system equipment costs accordingly.

BACKGROUND TO THE INVENTION

Liquid Air Energy Storage (hereinafter "LAES") has previously generally been considered only suitable for large-scale energy storage due to the need for economies of scale, and the increase in component efficiencies with increasing scale, to enable a suitable cost per kW to be achieved in order to make these systems commercially viable. There is a clear need for efficient and low cost energy storage behind the meter, where electricity costs are some multiple of the wholesale cost at the point of generation. This will allow electricity consumers to minimize their energy costs by a large number of mechanisms, including purchasing energy at its lowest cost for use when the cost is higher, but also supplying valuable grid stabilization services such as demand response. In this way, the future grid will be able to more efficiently and effectively operate with increased levels of renewable electricity generation utilizing at least 3 mechanisms; energy storage to allow industrial processes to continue to operate profitably when electricity costs are high due to low levels of renewable electricity generation, a higher utilization factor for the distribution network as the periods of low demand are utilized for charging up of the LAES system and DSR services to stabilize a grid made significantly less stable by the removal of the fossil fuel generators which, though extremely polluting, can provide very effective grid stabilization services at the point of generation. Energy storage is often only seen in terms of electricity in: electricity out systems, but these are generally the most expensive in terms of cost per kW and cost per kWh.

Another method to achieve a similar result for an industrial electricity consumer, but with a hugely reduced cost per kW and kWh is to use process integrated energy storage, where an existing industrial process is adapted to include energy storage. In the case of industrial air compression systems, it is not necessary to store energy in a form where it can be converted back to electricity for further conversion to compressed air. A significant part of a liquid air energy storage system is associated with compressed air provision, and this equipment is already in place in facilities with a requirement for compressed air within their industrial processes.

In addition, it is not necessary to convert the liquid air to electricity for further conversion to compressed air, with the high capital costs and associated energy losses associated with these conversion processes; liquid air can be converted to compressed air to be directly supplied to the process or processes. This will necessarily reduce the cost, complexity and losses inherent in an energy storage system based on this principle, and will result in a system which is both cheaper and more efficient. It can therefore be seen that in an energy storage system where the objective is to take compressed air, store it as pressurized liquid air and return it as compressed air, in comparison with a conventional liquid air energy storage system, the avoidance of the conversion steps of converting the evaporated air from compressed air to electricity and back to compressed air will avoid the losses associated with these steps and therefore increase dramatically the round trip efficiency seen by an industrial user.

A very large part of the losses of a LAES system are associated with the coolth recycle system, where the refrigeration effect produced when the liquid air is evaporated and increased in temperature is stored for use when the system is later required to produce further liquid air for storage. Due to the very low COP of cryogenic refrigeration systems caused by the very large temperature drop required, many kW of electrical power are required to produce 1 kW of refrigeration. Thus the coolth which is stored between cycles is very valuable and any which is lost is required to be made up at very high cost. To illustrate this, it has been calculated that an electricity in/electricity out LAES system with 70% round trip efficiency (the percentage of electricity input to the system which is available for output), a coolth recycle system which only loses between 2 and 4% of the recycled coolth is required. This is very expensive and difficult to achieve.

Due to the reduction in energy losses to this LAES system from the reduced number of conversion steps, the individual sub-system elements can therefore have a lower efficiency while still maintaining the overall round trip efficiency of the electricity in/electricity out LAES system. As the coolth recycle system to return a 70% RTE (96 to 98% recycle efficiency) for an electricity in/electricity out LAES system is so very expensive, it is apparent that a significant cost saving can be made to a system by allowing the recycle efficiency to be reduced. A coolth recycle system with 2 or 3 times the coolth losses may be a fraction of the cost, and applied to a compressed air in/compressed air out LAES system, still result in a 70% RTE.

Further opportunities to both reduce the losses and the cost of a compressed air in/compressed air out LAES system can accrue from the optimization of the liquid air production system to suit the cycle.

If liquid air is stored in a pressurized state, the shape of the temperature/enthalpy curve as the liquid air is evaporated can be matched closely, but offset to a higher temperature for the condensation process at a higher pressure. The characteristic of the coolth recycle process is shown in FIG. 3. The two curves can be arranged to have the minimum distance between them maintained over substantially the whole of their extent.

The exergy losses to the system can be minimised by choice of pressures to maintain the temperature difference over which the heat transfer of the coolth recycle system occurs (which is also occurring over a time difference) to a virtually single value which is able to be achieved by the combination of heat exchangers and the sensible or latent heat storage materials used. The graph of FIG. 3 can be seen to have 2 distinct regions, with a flatter part at lower temperature where the energy storage requirement per unit temperature change is high, and a steeper part where the energy storage requirement per unit temperature change is lower.

This characteristic lends itself to the use of 2 distinct coolth storage receptacles. The flatter part of the graph will be associated with the low temperature coolth storage receptacle, which can use either a suitable low temperature phase change material or mixture of materials (or other material with these thermodynamic characteristics) or a larger mass of single phase material.

The steeper part of the graph indicated the operating regime of the higher temperature coolth storage receptacle, which is suited to the use of a single phase material accepting and rejecting sensible heat, but could equally well use a suitable phase change material or mixture of materials (or other material or mixture of materials with these thermodynamic characteristics) if this was able to accept and reject heat over a suitable range of temperatures.

The exergy losses a of coolth recycle system are associated with both the temperature difference across the heat exchange processes and the enthalpy loss to the environment of the system. The exergy losses due to temperature difference can be topped-up by the above described method; some method of topping-up the enthalpy losses are therefore required. This can be achieved by the use of the pressure difference between the storage pressure of the liquid air and the pressure at which the produced compressed air is supplied back to the industrial or commercial user. The liquid air can be evaporated and heated at close to the storage pressure (with the coolth stored for subsequent use), with the heating process for either the whole or some part if the flow curtailed at a suitable temperature such that the cold, pressurized air can be expanded to the lower, delivery pressure with the production of additional coolth.

The Coefficient of Performance (COP) of a refrigeration system is lower the further the temperature at which the cooling is supplied is away from the temperature that heat is rejected to. The temperature required to produce liquid air for storage at ambient pressure is significantly lower than the temperature required to produce liquid air at an elevated pressure. Thus storage of liquid air at higher than ambient pressure allows lower energy use and therefore higher RTE for equivalent efficiency of compression and heat exchange processes. In addition, the storage temperature, being closer to ambient, reduces the heat soak from the environment to the stored liquid air, further increasing the RTE.

It can be seen from the above description that no heating of the evaporated liquid air at above ambient pressure is required to achieve a commercially viable RTE. It is therefore apparent that no storage of the heat of compression of either the shop air compression process or the booster compression process is necessary to achieve this RTE. It then follows that the heat produced is available for use by a system operator or for sale to local users or to a heat network. In this manner, the effective RTE of a system can be further increased above the 60 to 70% value expected to be achieved without waste heat utilization.

Though compressed air systems often have some air storage in the form of an air receiver, the function of this is not to allow the compressor to be turned off for any significant period of time during normal operation where compressed air is being supplied to a process at a typical range of rates. It is purely a very short-term storage facility to allow stable operation of the system when a modulating control method is used (compressors operating at full capacity or standby) or a variable capacity compressor is used with insufficient turn-down to provide the minimum flow required by the process being supplied. In addition the air storage provides a stabilizing function to maintain air pressure within close boundaries which would otherwise be difficult to maintain with typical compressor control systems. To provide a demand-side-response function from a compressed air system would require enormous volumes of compressed air to be stored, or large volumes of high pressure compressed air to be stored and for this air to be reduced in pressure before use.

If the air were reduced in pressure via a valve, large quantities of exergy would be destroyed and the system would achieve a very low round-trip efficiency. If an expander with work output were used then the large temperature drop during the expansion would necessitate pre-heating of the high pressure compressed air to prevent the freezing of the expander and downstream pipework and potentially any equipment or processes supplied. This heat would be required to be supplied from a heat store which was topped up by the heat of compression during the compression of air, a source of waste heat which was of great enough magnitude and reliably available whenever required, or some heating method such as combustion. A further problem with an expander/generator system in this context is the reduction in pressure of the high pressure air storage during discharge requiring an expander with an unusually wide operating map to enable maximum required air output at all high pressure receiver pressures.

An alternative to the use of compressed air storage is the use of liquid air storage. Due to the very high density of liquid air above that of compressed air at the same pressure and at ambient temperature, some large multiple of the mass of air stored can be achieved. For demand side response (DSR) services to the grid, the system can respond in the time it takes for the switch gear to respond to the command to take the compressor off-line; the compressed air demand can be provided by the shop-air system compressed air cylinder in the time the liquid air system takes to evaporate air to be provided as compressed air. An additional advantage from storing the air in its liquid state is that the pressure will not change during discharge so the expansion device or devices can operate over a constant pressure ratio and at a mass flow rate which does not change as the inlet pressure and therefore density changes. Any devices added to the expander of the LAES system to enable a broader operating map will only be required to attend to the requirement for a range of mass flow rates and not a range of volume flow rates, a range of gas densities and a range of pressure ratios. This will make the expansion device cheaper and generally higher in efficiency, with the broader operating map being able to be used to match supply of air with demand over a significantly increased range.

As shop air compressors which are required to supply a variable air flow rate can reduce in efficiency significantly when required to supply a mass flow rate lower than design flow rate, and a variable geometry expander (such as a radial turbine with variable nozzle vanes) can supply a variable mass flow rate with a significantly smaller efficiency deficit, the RTE of a LAES system such as the one herewith described using this type of expander can be significantly higher than the steady state RTE from the LAES system due to a reduction losses from the use of the compressor at maximum efficiency during LAES system charging opposed to the lower efficiency of the variable flow compressor supplying air at sub-optimum efficiency when demand of air is low.

Energy storage systems in general are able to stabilize electricity grids in such a way as to allow greater penetration for low or zero carbon renewables and energy sources which are not dispatchable. Additional advantages tend to accrue to behind-the-meter energy storage systems in that they can increase the capacity utilization of local grids, reducing the magnitude of peak electricity demands and therefore allowing a local grid with a certain peak capacity to deliver a higher average load. This reduces the costs of construction and use of new grid capacity and can prevent the need for costly grid upgrades in many circumstances.

SUMMARY OF THE INVENTION

According to a first aspect of the present invention there is provided gas storage apparatus comprising a fluid inlet, a first coolth store, a second coolth store, and at least one storage chamber, wherein the fluid inlet is connected to the first coolth store, and fluid conduits connect the first coolth store to the second coolth store, and the second coolth store to the at least one storage chamber.

It will be appreciated that further components may be provided between the above described integers.

The first and second coolth stores may be arranged sequentially, with one or more fluid transport inter-coolth conduits providing a fluid pathway between the first and second coolth store.

The second coolth store may augment the coolth storage of the first coolth store.

The first coolth store may be adapted for sensible heat.

The second coolth store may be adapted for latent heat.

The gas may be air.

The coolth stores may be selected from a group comprising: gravel bed; phase-changing material; glass; concrete; metal.

The first coolth store may have a first coolth top-up device.

This may comprise a refrigeration system configured to remove heat from fluid within, entering or leaving the coolth store or from the coolth storage media.

The second coolth store may have a second coolth top-up device.

It will be appreciated that the second coolth top-up device may function as a coolth-top up device for the entire system.

The second coolth store may have such a coolth top-up device irrespective of whether the first coolth has a top-up device or not.

The first coolth top-up device may include a turbine.

The first coolth top-up device may include an expander.

The second coolth top-up device may include a turbine.

The second coolth top-up device may include an expander.

The gas storage chamber may be a pressure vessel which stores the fluid as a liquid.

The fluid exiting the first and/or second coolth store may be directed through a sub-cooling device.

The fluid exiting the first and/or second coolth store may be directed through a compander.

The fluid inlet may branch into a bypass fluid circuit.

The apparatus may further include a first heat exchanger.

The bypass fluid circuit may be connected to a first side of the first heat exchanger.

The apparatus may include a storage fluid line running from the first and/or second coolth and terminating at the gas storage chamber.

The apparatus may further include a second heat exchanger.

The storage fluid line may be connected into a first side of the second heat exchanger.

The apparatus may also include a coolth bypass branch conduit extending from the one or more fluid transport inter-coolth conduits.

The coolth bypass branch conduit may be connected to the second side of the first heat exchanger.

An expander may be provided on the coolth bypass branch conduit.

A second heat exchanger outlet line may be connected to the second side of the second heat exchanger.

The second heat exchanger outlet line may be connected into the second side of the first heat exchanger line.

The apparatus may include a first heat exchanger first side exit line extending from the first side of the first heat exchanger.

The first heat exchanger first side exit line may be connected into the one or more intra-coolth store lines.

The first heat exchanger first side exit line may be connected into the compander.

The apparatus may include one or more Joule-Thomson valve(s).

The Joule-Thomson valve may be provided on a second side second heat exchanger line.

The second side heat exchanger line may be connected to the storage fluid line.

A pressure reduction valve may be located on a fluid supply line between the second heat exchanger and the fluid storage chamber.

The apparatus may be adapted for use with compressed air.

The gas storage apparatus may be adapted such that the charging pressure is above the discharging pressure and the storage pressure is between these two pressures.

A pressure difference between any two points in the cycle is used via an expansion process to provide refrigeration in order to replenish exergy losses during the coolth recycle process between discharging and charging processes.

A multi-stage compression system having an inter-stage pressure similar or equal to the storage system gas output pressure and a compressor final stage output pressure similar or equal to the storage system gas input pressure during charging may be used.

This compression system can be formed of two or more compressors or be a single, multi-stage compressor which is able to operate individual stages or groups of stages individually.

According to a second aspect of the present invention there is provided energy generating apparatus including at least one gas storage apparatus according to the first aspect.

The energy may be electrical energy. The energy generating apparatus may also be able to store energy by using lower priced off-peak demand electricity to liquify ambient air, and be able to reconvert that to electricity at peak demand times.

The energy generating apparatus may include a third heat exchanger.

The third heat exchanger may have three sides.

The energy generating apparatus may include a power expander.

Gas stored in the gas storage apparatus as liquid may be used to provide a source of pressurised gaseous air to be directed through a power expander.

The power expander may have two or more expansion stages.

The pressurised gaseous air may be fed through a first side of the third heat exchanger.

Fluid from the first coolth store may be directed through a second side of the third heat exchanger.

The pressurised gaseous air may be fed through a high pressure side of the power expander.

Lower pressure gas exiting the high pressure side of the power expander may be directed through a third side of the third heat exchanger.

The lower pressure gas may be directed through a low pressure side of the power expander.

According to a third aspect of the present invention there is provided a method of storing gas, the method comprising the steps of:
 raising the pressure of the gas to be stored to a first pressure and being at a first temperature;
 passing the gas to be stored through a first coolth store;
 passing the gas to be stored from the first coolth store through a second coolth store;
 passing the gas to be stored from the second coolth store into a storage chamber.

The method may further comprise the step of redirecting a portion of the gas prior to entry into the first coolth store into a first side of a first heat exchanger.

The method may further include the step of mixing the output gas from the first side of the first heat exchanger with the gas passing from the first coolth store to the second coolth store.

The method may further include the step of expanding the output gas from the first side of the first heat exchanger into a two-phase fluid.

The method may further include the step of passing the two-phase fluid through the second side of a second heat exchanger.

The method may further include the step of passing the two-phase fluid exiting the second heat exchanger into the second side of the first heat exchanger.

The method may further include the step of expanding the two-phase fluid exiting the first heat exchanger.

The method may further include the step of passing a proportion of the fluid exiting the second coolth through a Joule-Thomson valve prior to entry into the second heat exchanger.

The method may further include the step of passing the fluid exiting the second coolth through a pressure reducing valve prior to entry into the storage chamber.

The method may further include the step of passing the fluid exiting the second coolth through the first side of a second heat exchanger.

The method may further include the step where the fluid is passed through the second heat exchanger prior to being passed through the pressure reducing valve.

BRIEF DESCRIPTION OF THE DRAWINGS

Embodiments of the invention will now be described, by way of example only, with reference to the following drawings, in which:

Turning to the drawings, FIGS. 1 and 2 show gas storage apparatus according to a first embodiment of the present invention.

FIG. 1 shows a LAES system apparatus during charging and FIG. 2 shows a LAES system during discharging. In one or more embodiments the LAES system will comprise a booster compressor which receives compressed air from a commercial shop-air system at a system inlet (16) and compresses it to a higher pressure in a booster compressor [compressor motor—(1), compression stage 1—(2), intercooler (4), compression stage 2—(3), aftercooler (5)]; an air treatment system (not shown—can be prior to system inlet) which removes water vapour and CO2; a cold energy thermal store—or also "coolth store" (7), cold box (6) and transfer system to temporally transfer the refrigeration effect provided by liquid air evaporation to be used for condensation of air by the liquid air production sub-system; a liquid air production sub-system comprising of a Joule-Thomson valve (8) and a liquid air separator (9); and a refrigeration system to provide for the unavoidable losses inherent in the cold energy store and transfer system. In the diagrams a two-stage refrigeration system is shown. Of course, it will be appreciated that the apparatus may have a dedicated compressor in place of a commercial shop-air system.

Figure 1:
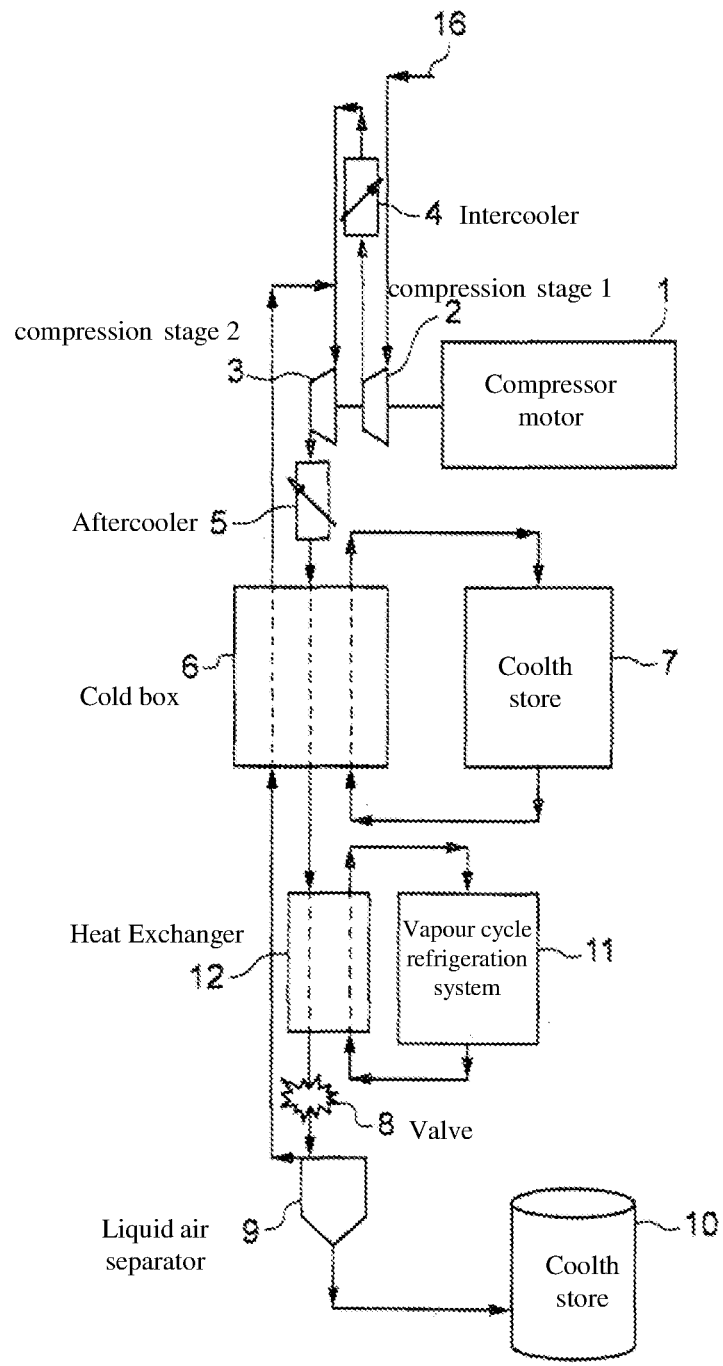
FIG. 1 is a schematic representation of the charging process of a first embodiment gas storage apparatus in according to the present invention.

The booster compressor will receive compressed air at a pressure of between 5 and 21 Bar(A) (though more normally at between 6 and 14 Bar(A)); this air will then be compressed (generally over 2 stages) to a pressure of between 13 and 60 Bar(A), with inter and aftercooling provided respectively by heat exchangers (4) and (5).

Stored coolth from the cold energy thermal store will be transferred to the high pressure compressed air to reduce its temperature to a low enough value such that when it passes through the Joule-Thomson (JT) valve a high proportion (typically above 50%) of the compressed air will be converted to intermediate pressure liquid air for storage. A higher proportion of air will be converted to liquid air if the air is in a supercritical state before expansion through the JT valve. The use of supercritical air pressure before the JT valve will also allow a degree of subcooling of the air to be applied, increasing the proportion of air converted to liquid air. The remainder of the air which has passed through the Joule-Thomson valve will be in a gaseous state at intermediate pressure and will be recuperated against the higher pressure (potentially supercritical) compressed air to reduce the temperature of the higher pressure compressed air. This intermediate pressure compressed air will be recompressed to the higher pressure in either a separate compressor or by being returned to the second stage inlet of the booster compressor if it is a two stage compressor to be returned to the high pressure state. The above processes will convert compressed air to liquid air during the charging phase of the cycle.

During the discharging phase of the cycle, stored liquid air will be evaporated by the transfer of heat from the cold thermal energy store; further heat will be removed from the cold thermal energy store by utilizing the refrigeration effect produced whilst expanding the intermediate pressure cold compressed air to the pressure at which the compressed air is to be supplied via a system outlet (17). Various embodiments of this system are possible including versions where:

1) A single expansion stage takes air at close to ambient temperature from the outlet of the heat exchanger of the coolth recycle system and expands it to the pressure at which the compressed air is to be supplied. This cold air is returned to the cold box at an appropriate position such that it is at a similar temperature to the other gas stream or streams providing refrigeration effect to the coolth storage system. The quantity of refrigeration effect will be high but the outlet temperature from the turbine will not be particularly low. Shaft power from the expansion process will be converted to electricity in a generator and exported to the grid, used within the industrial undertaking or used to power aspects of the energy storage system.

2) A single expansion stage takes air from an intermediate point within the heat exchanger of the coolth recycle system and expands it to the pressure at which the compressed air is to be supplied. This cold air is returned to the cold box at an appropriate position such that it is at a similar temperature to the other gas stream or streams providing refrigeration effect to the coolth storage system. The outlet temperature from the turbine will be reduced in comparison with embodiment 1) and quantity of refrigeration effect will be reduced. Shaft power from the expansion process will be converted to electricity in a generator and exported to the grid, used within the industrial undertaking or used to power aspects of the energy storage system.

3) Air is taken at close to ambient temperature from the outlet of the heat exchanger of the coolth recycle system, this is cooled further using an additional refrigeration source and expanded in a single expansion stage to the pressure at which the compressed air is to be supplied. This cold air is returned to the cold box at an appropriate position such that it is at a similar temperature to the other gas stream or streams providing refrigeration effect to the coolth storage system. The outlet temperature from the turbine will be reduced in comparison with embodiment 1) and quantity of refrigeration effect may be increased. Shaft power from the expansion process will be converted to electricity in a generator and exported to the grid, used within the industrial undertaking or used to power aspects of the energy storage system.

4) Dual expansion stages are used, with one stage using the method described in versions 1), 2) or 3) above, and another stage using a method described in versions 1), 2) or 3) which was not used by the other of the two expansion stages.

5) Any of the above methods are used, with shaft power from the expansion process being used to drive a compressor. This compressor can be compressing a flow within any appropriate part of the energy storage system. If it is recompressing a flow which is returned to a higher pressure position in the cold box or used with a suitable recuperation process or external source of refrigeration, additional refrigeration effect will be available to the coolth recycle system.

In any of the above five variants, additional refrigeration can be provided from an external source or from a refrigeration system forming part of the system. Refrigeration can be used to provide cooling to any of the flows at any temperature below ambient.

Figure 2:
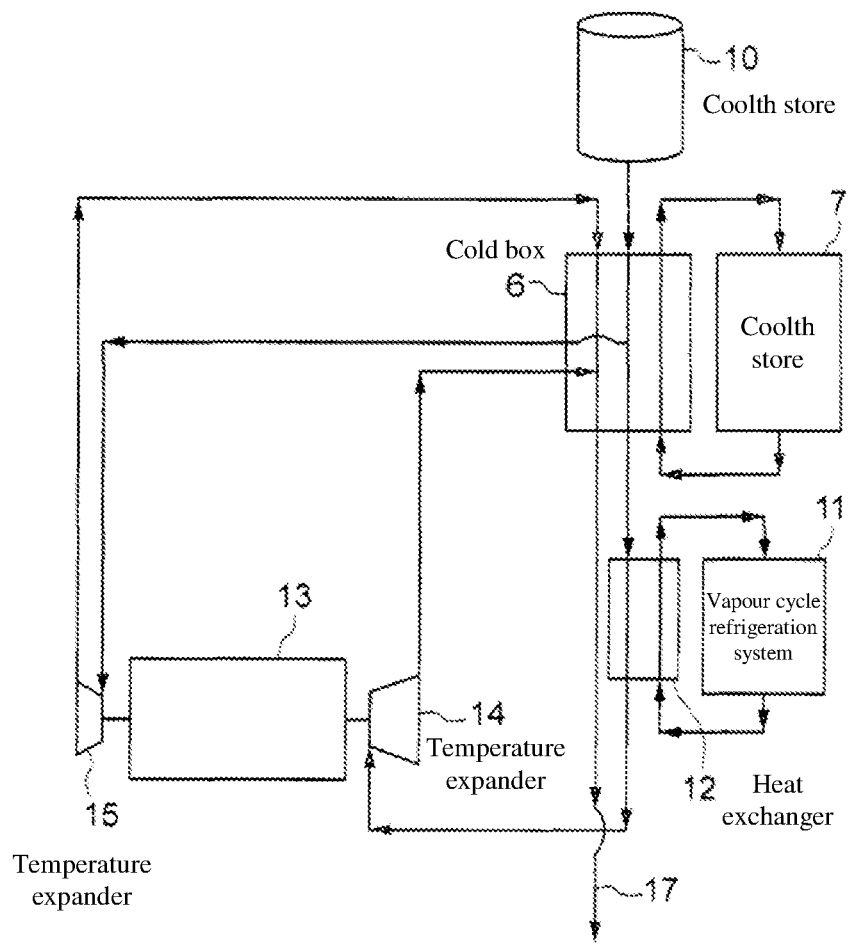
FIG. 2 is a schematic representation of the discharging process of the gas storage apparatus of FIG. 1.

In the FIG. 2 process, a vapour cycle refrigeration system (11) cools a portion of the compressed air using a heat exchanger (12) after it has been evaporated and warmed against the coolth recycle system (11) in the cold box (6) before it is passed through the higher temperature expander (14). It then is returned to the cold box (6) at a suitable position to be used to provide further cooling to the coolth recycle system. The other portion of the evaporated compressed air flow is removed from the cold box at a position part way through the cold box, passed to low temperature expander (15), form where it returned to the cold box (6) at a suitable position to be used to provide further cooling to the coolth recycle system. In the described system, a single cold box and coolth recycle system is shown.

Figure 3:
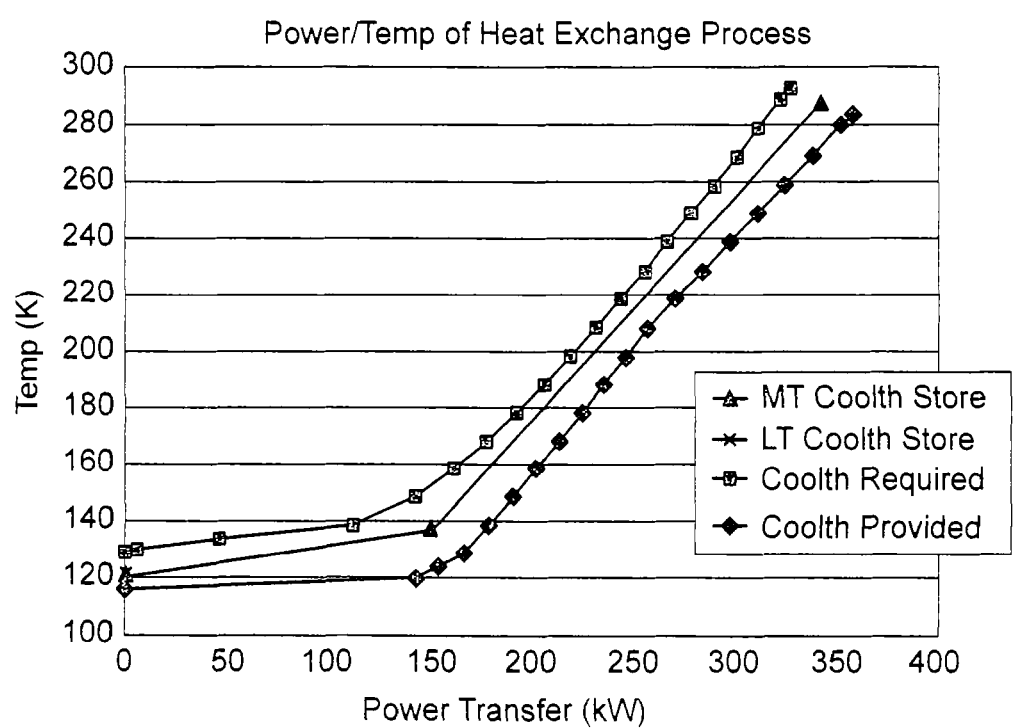
FIG. 3 is a Power vs Temperature graph of Heat Exchange Processes.

It will be advantageous in terms of cost if a single cold box is used for both charging and discharging the system. Suitable intakes, outlets and valving to allow it to be used for both functions will be necessary. A single coolth recycle system would be advantageous from a cost standpoint; if this is not possible then a two-part coolth recycle system can be used. The temperature versus heat energy transferred for a typical system is shown in the graph shown in FIG. 3. The compressed air at both the high and intermediate pressures has a similar shape to the temperature/energy curve though the high pressure air is at a supercritical pressure.

It can be seen that there are two distinct parts to the curve, a "flatter" region where a larger energy change is associated with a smaller temperature change, and a "steeper" region where a smaller energy change is associated with a larger temperature change. A two part coolth recycle system could be configured to cater for these distinct characteristics of the heating process. A phase change material may be better suited to the coolth storage for the "flatter" region and a single phase material to the steeper region.

A well-known problem with LAES systems is the stratification of oxygen and nitrogen which can occur during storage of liquid air, which can cause safety issues due to the ability of air with a higher than naturally occurring oxygen content to support more vigorous combustion and for combustion to be initiated over a broader range of conditions. In addition, the initial liquid air produced by the machine at each start-up is likely to have a slightly increased oxygen content due to nature of the flash process and flash gas recycle. It may be necessary to increase the Nitrogen content of the initial air charge to the system to avoid the oxygen content from exceeding the concentration at which increased material specifications are required. This may be achieved by use of some fractioning column type arrangement to create two or more streams with differing oxygen content.

The low oxygen content stream could be stored separately, either as a liquid or a pressurized gas, and introduced during liquefaction system start-up to ensure the oxygen content does not increase above the previously mentioned trigger value at any stage or part of the process. Though the high oxygen content stream could be discarded or used on-site for some purpose, if of sufficient concentration it could also have some commercial value and be sold to provide further revenue to a system operator. Some possible configurations of the system could allow operation of parts of the charging and discharging system simultaneously to liquify air for sale as liquid air or for fractioning into commercially valuable constituents.

Figure 4:
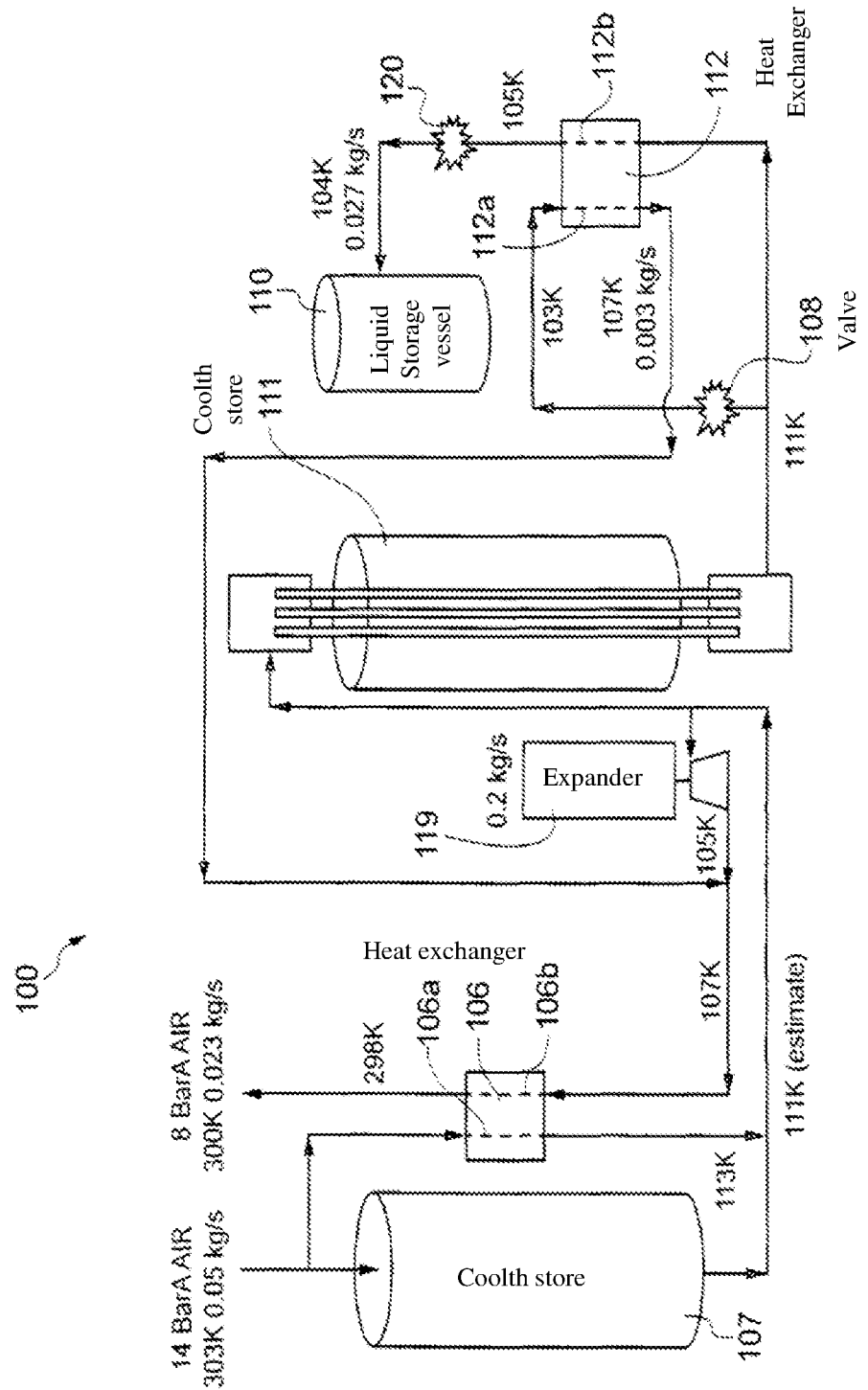
FIG. 4 is a schematic representation of the charging process of a second embodiment gas storage apparatus in according to the present invention.
Figure 5:
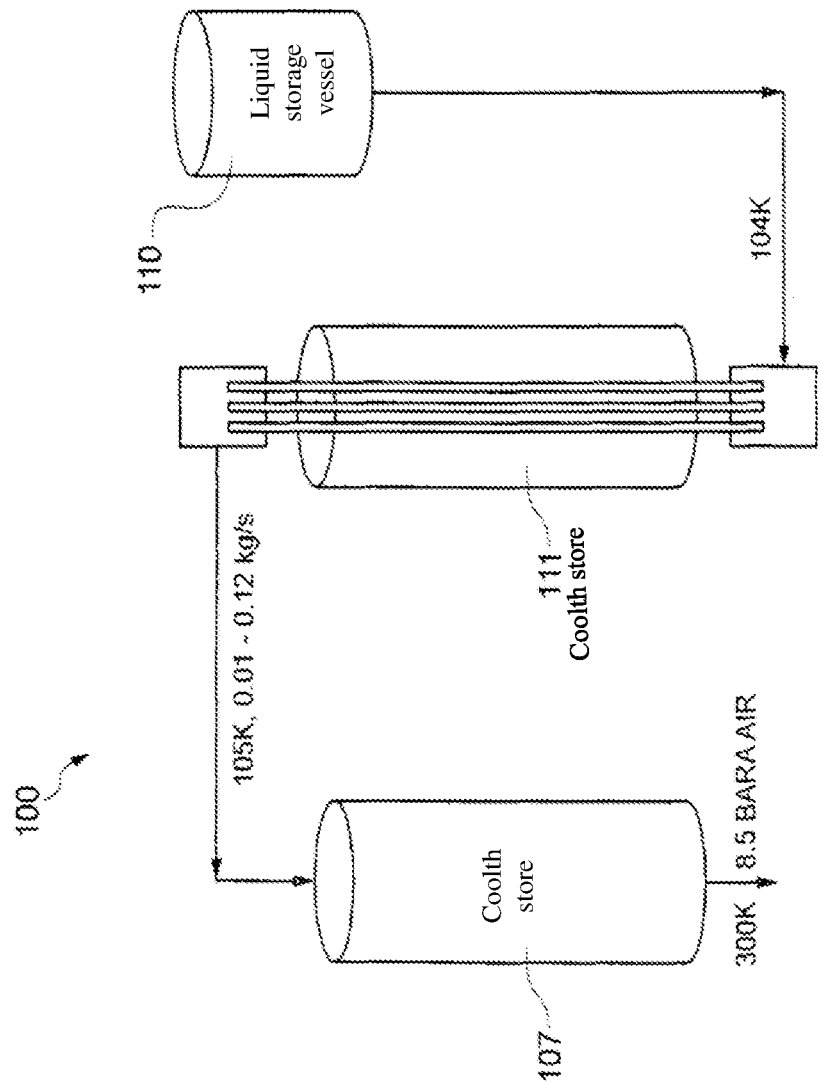
FIG. 5 is a schematic detail view of the discharging process of the second embodiment gas storage apparatus of FIG. 4.

A second embodiment apparatus is depicted in FIGS. 4 and 5 generally referred to as 100. Similarly functioning integers as the first embodiment use a similar numbering scheme albeit prefixed with a "1" and, unless described in further detail below, their type and function may be inferred from the above description. FIG. 4 shows the charging of the system i.e. the transformation of gaseous air to liquid air and FIG. 5 shows the discharging of the system i.e. the transformation from liquid air to gaseous air.

The second embodiment has a lower intake pressure, the gaseous air entering the apparatus at around 14 Bar(A) (as opposed to the nominal 13 to 60 Bar(A) pressure described above after the potential two-stage pressure boosting), at around room temperature (303K for the purposes of the present description) with a flow-rate of 0.05 kg/s. This is from the primary compressor or shop air system, and may be higher if a booster compressor is employed.

The gaseous air is directed initially to a first coolth store 107, being in the present embodiment a gravel bed type coolth store 107. This cools the gaseous air such that it exits the coolth store with a temperature of around 111K. The air is still in a gaseous phase at this point, the first coolth store 107 having removed sensible heat but maintained the gaseous phase. This sensible heat coolth store although being described as being of the gravel bed type may be substituted for other suitable alternatives, such as glass, concrete, metal or similar and may even potentially be a phase change material or thermochemical material coolth store, provided its properly configured to remove and replace sensible heat over an appropriate temperature range.

A small proportion of the gas is diverted away from the coolth store 107 and into the first side 106a of a first heat exchanger 106. The gas exiting the heat exchanger on the first side will have been reduced in temperature to around 113K, before being subsequently merged with the gas flow from the first coolth store 107.

It will be appreciated that suitable pipework, conduits or the like will be used to transport that various phases of gas and/or liquid between the various components of the system.

The gaseous air is then directed through a second coolth store 111. This is a latent heat coolth store 111 and in the present embodiment is of a Phase Changing Material ("PCM") type, but it will be apparent that other suitable coolth stores are possible, such as thermochemical, or even gravel bed or one of the types described above in relation to the first coolth store. The main factor is that the first coolth store 107 is mainly adapted for sensible heat and the second coolth store 111 is mainly adapted for latent heat, there being a change in temperature apparent across the first coolth store 107 and a change in phase across the second coolth store 111.

A proportion of the gaseous air between the first and second coolth stores is drawn off to an expander 119 which reduces its temperature to 105K and its pressure to 8 BarA.

40% is the amount drawn off in the present embodiment, although it may be more generally in the range from 20 to 50%.

The air upon exit from the second coolth store 111 in the FIG. 5 process should be in a fully liquid state, still at a pressure of around 14 BarA with the temperature maintaining at around 111k. The liquid air can be stored in this state or reduced in pressure for storage.

If it is reduced in pressure directly from the LHCS it will reduce in temperature and some of it will flash to gas. To avoid it flashing to gas it can be sub cooled before its pressure is reduced. The sub-cooling is a good opportunity to top-up the coolth lost over the cycle.

In the present embodiment, a small proportion of the liquid air at 14 Bar(A) is directed towards a Joule-Thomson valve 108 which changes the liquid air into two-phase air and reducing its temperature to around 103K. About 5%-20% is drawn off, more specifically around 10% in the present embodiment, although the specific level may be varied. The first side 112a of a first heat exchanger 112 receives the two-phase air. The remainder of the liquid air exiting the second coolth 111 is directed towards the second side 112b of the second heat exchanger 112. Heat transfer therefore takes place between the two-phase air from the Joule-Thomson valve 108 and the liquid air direct from the second coolth store 111, increasing the temperature of the two-phase air to 107K and reducing the liquid air temperature to 105K.

A pressure reducing valve 120 reduces the liquid air from 14 Bar(A) to around 9 Bar(A) for subsequent storage in the liquid storage vessel 110, being a suitable pressure vessel.

This process acts to "top-up" the coolth of the second coolth store 111.

The two-phase air changes to gaseous air at around 107K in the second heat exchanger 112 and is directed through the second side 106b of the second heat exchanger 106, thereby enabling heat transfer between it and the first coolth bypass gas. The gas exiting the expander 119 is mixed with the gaseous air exiting the second heat exchanger 112.

The gaseous air exits the second side 106b of the second heat exchanger at a pressure of 8 Bar(A) and at around 300K. This air may then be routed back to the booster compressor (not shown) for re-entry into the system.

The first heat exchanger 106 acts as a "top-up" device for the first coolth store 107.

FIG. 4 shows the more simplified discharge of the apparatus 100. Liquid air at 9 Bar(A) and 104K is fed from the liquid storage vessel 110 through the second coolth store 111, where it changes phase to a gas at 105K and around 8.5 Bar(A), before passing through the first coolth store 107 where its pressure and phase remain largely constant (although pressure may change slightly due to frictional losses), but its temperature is increased to around 300K.

Figure 6:
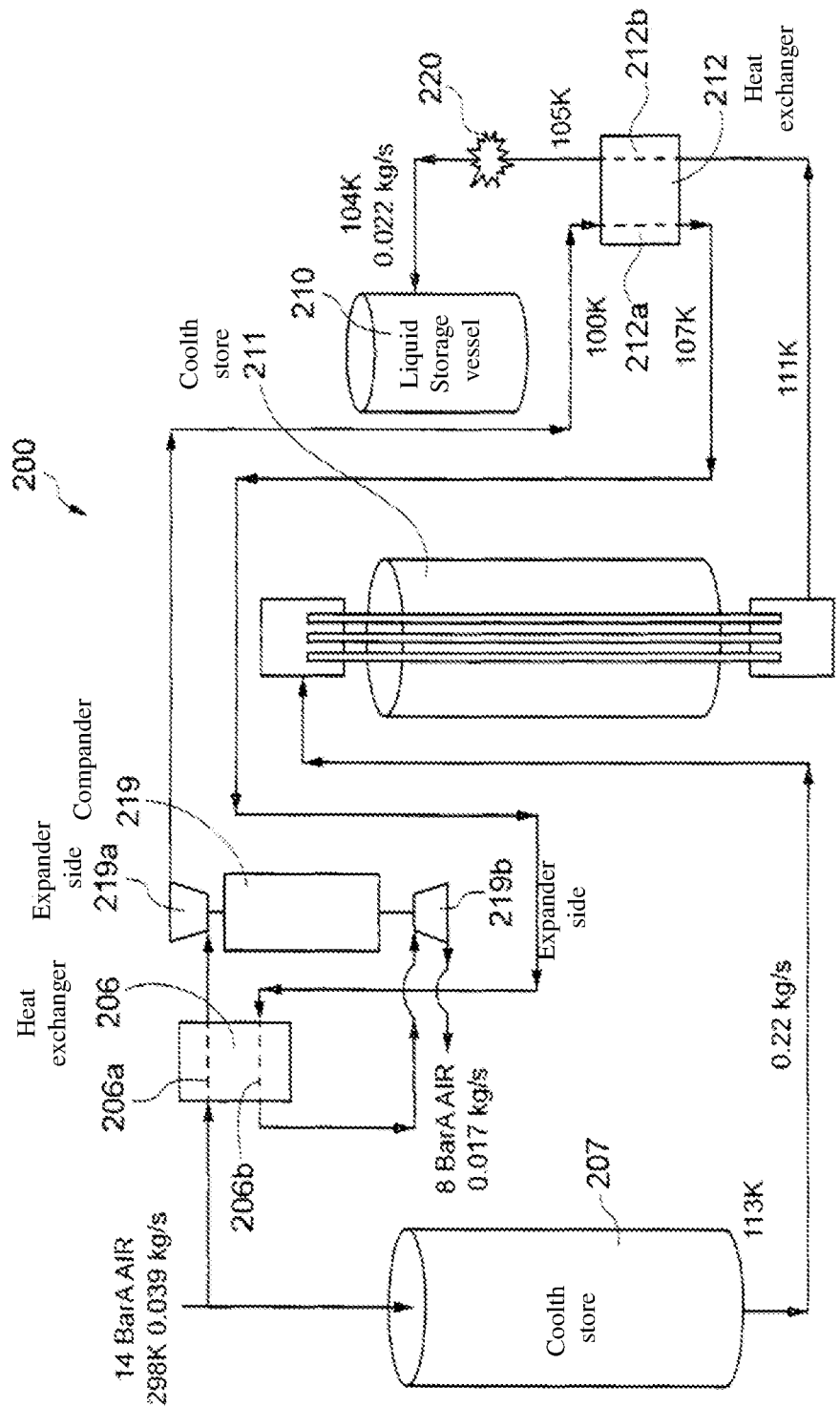
FIG. 6 is a schematic representation of the charging process of the third embodiment gas storage apparatus according to the present invention.
Figure 7:
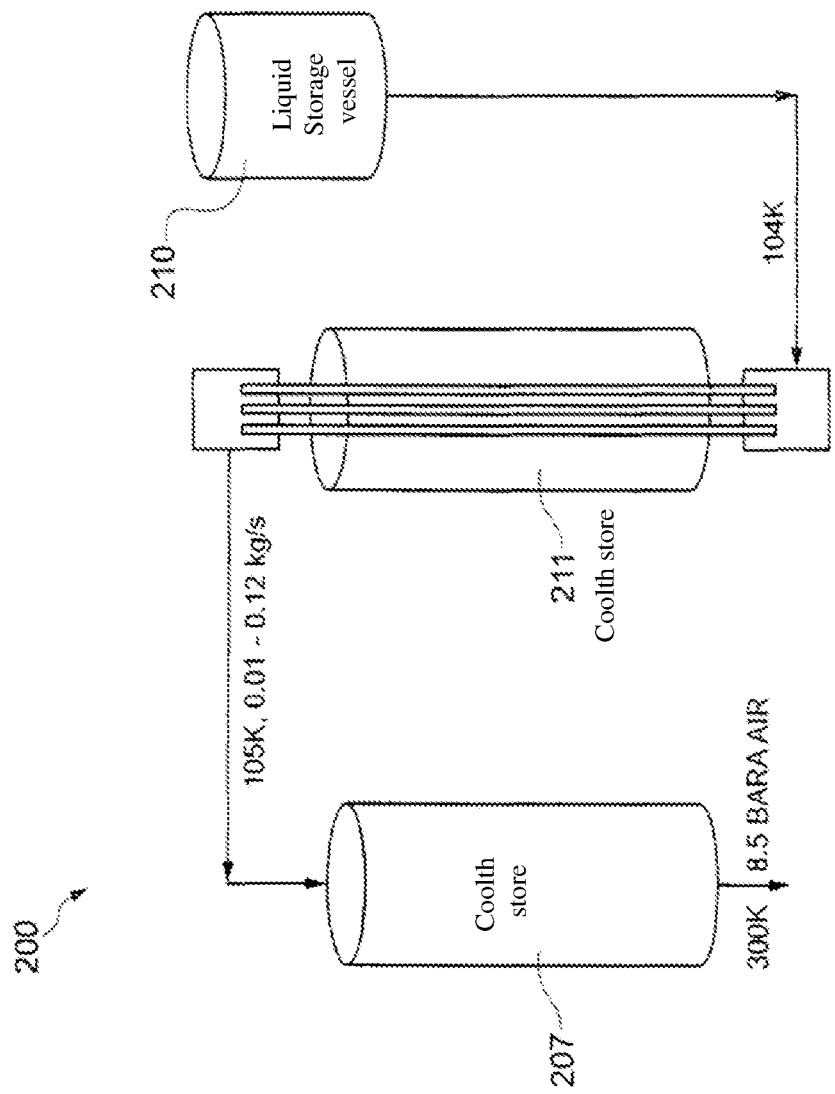
FIG. 7 is a schematic detail view of the discharging process of the third embodiment gas storage apparatus of FIG. 6.

A third embodiment apparatus is depicted in FIGS. 6 and 7 generally referred to as 200. Similarly functioning integers as the first three embodiments use a similar numbering scheme albeit prefixed with a "2" and, unless described in further detail below, their type and function may be inferred from the above description.

The third embodiment shares a degree of similarity with the second embodiment.

The gaseous air enters the system at 298K, 14 Bar(A) at a flow-rate of 0.039 kg/s.

The function and type of the first coolth store 207 and the second coolth store 211 are the same as that described above, although it will be noted that there is no gas draw off between the two coolth stores.

The pre-first coolth gas drawn off to enter the first side 206a of the first heat exchanger 206. Compander 219 receives the gaseous air which exits the first side 206a of the first heat exchanger 206. This is the expander side 219a, the gas expanding from 14 Bar(A) to 8 Bar(A).

The now two-phase fluid exiting the compander 219 at 100K is directed through the first side 212a of the second heat exchanger 212, where its changes to a gaseous phase at around 107K. This gaseous phase is directed through the second side 206b of the first heat exchanger 206 where heat transfer takes place between it and the gas drawn of from the pre-first coolth supply. It will be noted that in certain conditions the fluid exiting compander 219 may be a single-phase.

The gas exiting the second side 206b of the first heat exchanger then passes through the compressor side 219b of the compander 219. This air may then be routed back to the booster compressor (not shown) for re-entry into the system.

It will be noted that the Joule-Thomson valve and the post second coolth 211 gas draw off has been omitted, since its function has been offset by the use of the compander 219.

In FIG. 7 it will be noted that the discharge cycle is similar to that of the second embodiment described above: the liquid air is returned to its gaseous state by the second coolth store 211 and its temperature increased by the first coolth store.

Figure 8:
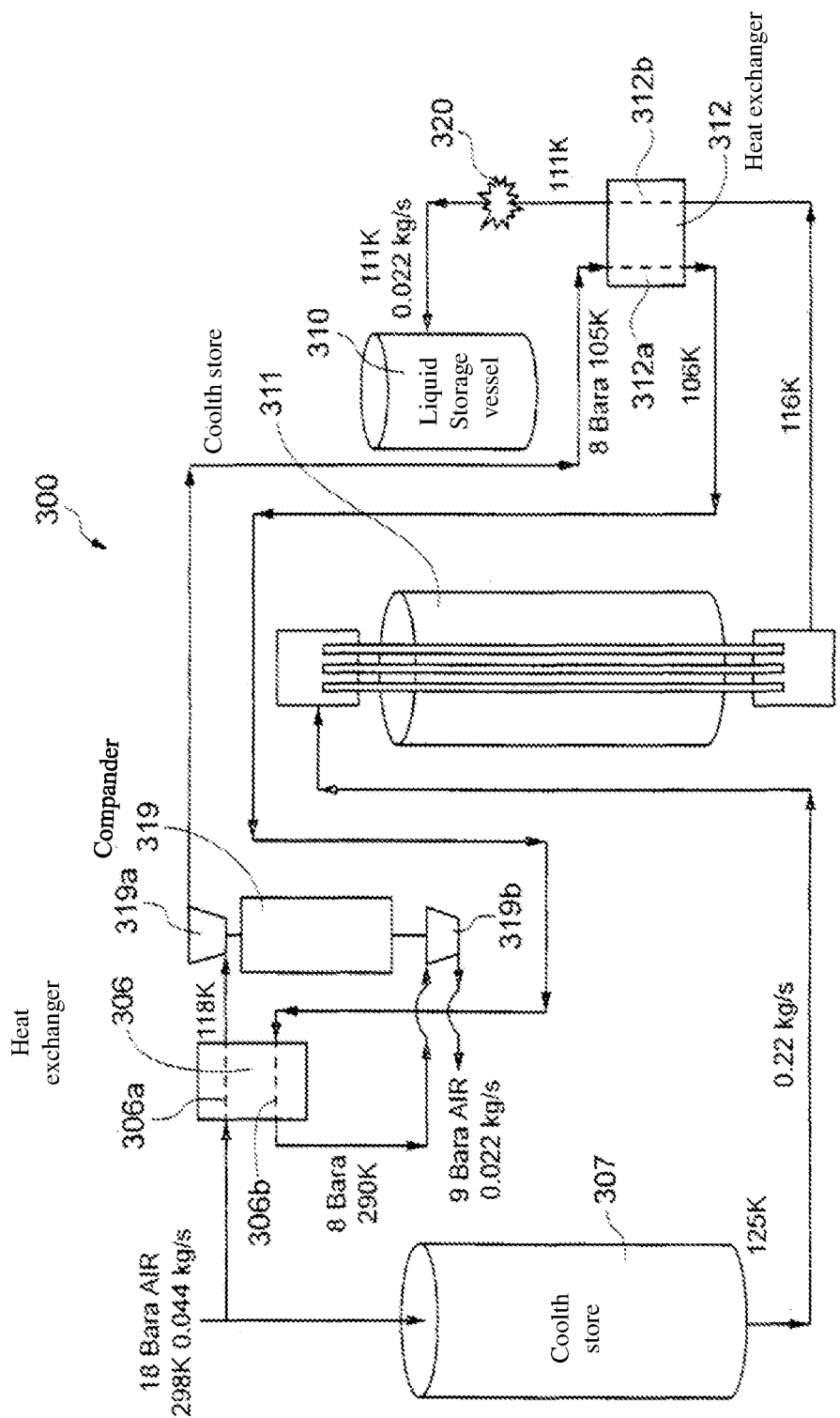
FIG. 8 is a schematic representation of the charging process of a fourth embodiment gas storage apparatus according to the present invention.
Figure 9:
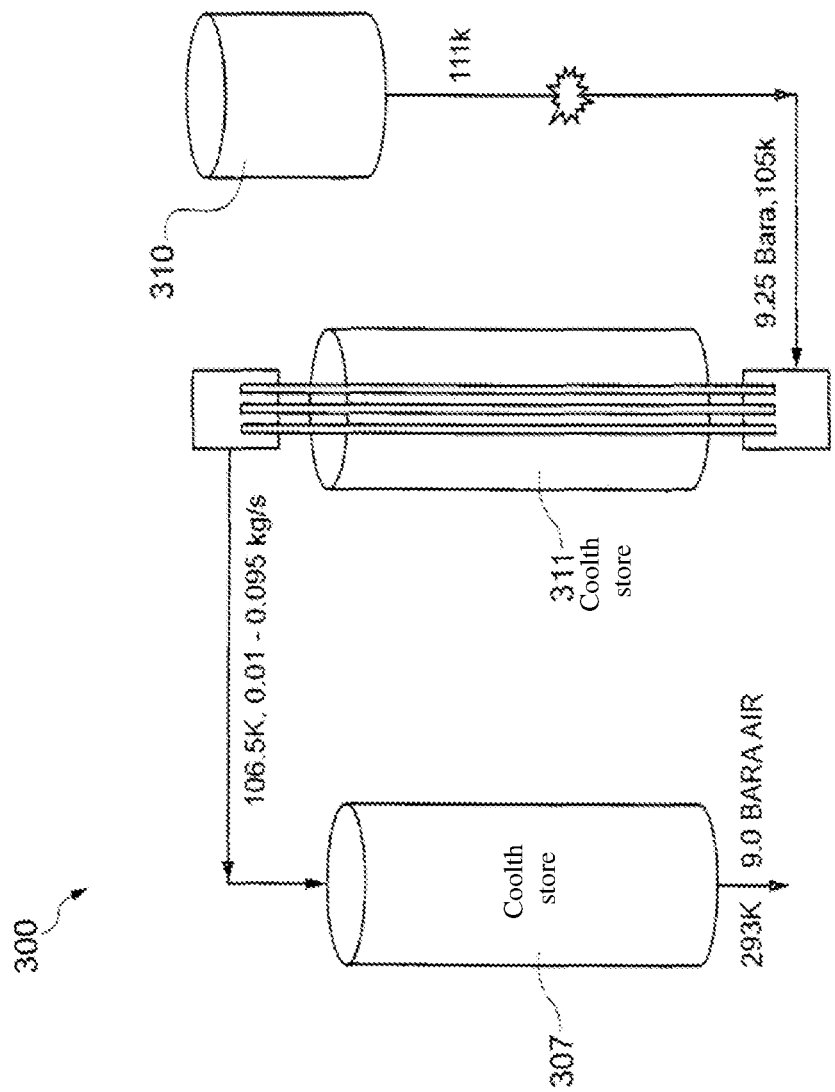
FIG. 9 is a schematic detail view of the discharging process of the fourth embodiment gas storage apparatus of FIG. 8.

A fourth embodiment apparatus is depicted in FIGS. 8 and 9 generally referred to as 300. Similarly functioning integers as the first four embodiment use a similar numbering scheme albeit prefixed with a "3" and, unless described in further detail below, their type and function may be inferred from the above description.

The fourth embodiment is largely identical to the third embodiment, albeit operating at slightly elevated pressures and temperatures.

Figure 10:
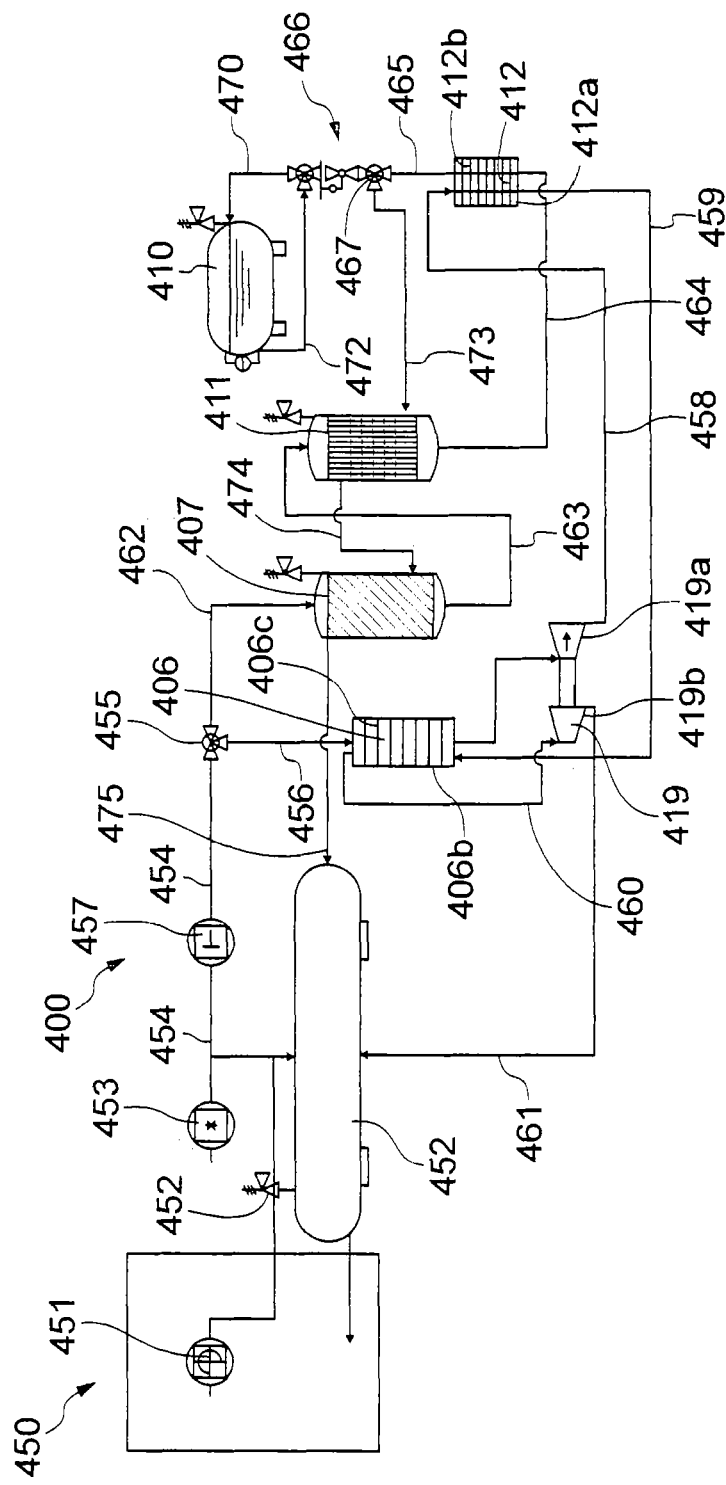
FIG. 10 is a diagrammatic representation of a fifth embodiment liquid air storage apparatus including a gas storage apparatus according to the present invention.

A fifth embodiment apparatus is depicted in FIG. 10 generally referred to as 400. Similarly functioning integers as the first four embodiment use a similar numbering scheme albeit prefixed with a "4" and, unless described in further detail below, their type and function may be inferred from the above description.

The fifth embodiment apparatus 400 is generally similar to the fourth and fifth embodiments as it uses a compander 419. The fifth embodiment also depicts further components useful in an installed "client" site, depicted schematically as 450.

The client site 450 has a client site compressor 451, being a 30 kW compressor operating at around 8 BarG. A client air receiver tank 452 is the main storage vessel for the gaseous air, which in the present embodiment has a 1000 litre capacity, which it holds at 8 BarG. A receiver pressure relief valve 452 is provided. The client air receiver tank 451 is fed by the client site compressor 451, and in turn may feed an air supply within the client site.

A first positive displacement ("PD") compressor 453 is provided, having a 7 kW power rating and operating at 8 BarG, and second PD compressor 457, having a 3 kW power rating and operating at 17 BarG, propel the gaseous air along a first pipeline 454 to a first three-way valve 455. The first PD compressor draws in environmental air at 0 BarG and pressurises it to 8 BarG before being further pressurised to 17 BarG by the second PD compressor 457. It will be appreciated that this description and direction of flow are of the "charging" cycle of the apparatus, in which gaseous air is liquified for storage in the vessel 410.

The first three-way valve 455 splits the flow of gaseous air and directs a portion of it through a second pipeline 456 towards the first or sensible heat exchanger 406 and then onto the expander side 419a of the compander 419. The air in the present embodiment is split 50/50, but it will be appreciated that this may be varied.

A third pipeline 458 connects the expander side 419b of the compander 419 to the first side of the second or latent heat exchanger 412, and two-phase fluid air is transported along this third pipeline 458 at a pressure of around 7 BarG and a temperature of around 105K.

A fourth pipeline 459 connects the outlet of the first side 412a of the second heat exchanger to the second side 406b of the first heat exchanger 406. Two-phase air at a pressure of 7 BarG and a temperature of 106K exits the second heat exchanger and is transported to the second side 406b of the first heat exchanger 406a.

A fifth pipeline 460 connects the second side 406b of the first heat exchanger 406a to the compressor side 419b of the compander 419. A sixth pipeline 461 connects the the compressor side 419b of the compander 419 to the client air receiver tank 452, and air exiting the compander 419 is around 8 BarG and 298K i.e. matching the conditions within the tank 452.

The first three-way valve 455 directs the other 50% of the gaseous air through a seventh pipeline 462 connecting the first three-way valve to the first or sensible coolth store 407 with air entering the first coolth store 407 at a pressure of 17 BarG and 298K in gaseous state, and exiting the coolth store 407 with a pressure of 17 BarG and at a temperature of 125K.

An eighth pipeline 463 connects the first coolth store 407 with the second or latent coolth store 411, which changes the phase of the air to liquid with a pressure of 17 BarG and at a temperature of about 116K.

A ninth pipeline 464 connects the second coolth store 411 to the second or subcooling heat exchanger 412, specifically on the second side 412b, where it may exchange with the two-phase fluid coming from compander 419 passing through the first side 412a.

A tenth pipeline 465 connects the second side 412b of the second heat exchanger 412 to a valve assembly 466. The valve assembly comprises a first, heat exchanger side three-way valve 467, a pressure control valve 468 and a storage side three-way valve 469.

In the charging operation, the liquid air passes through these three valves in the order mentioned above, before entering the storage vessel 410 through an eleventh pipeline 470.

In the discharge operation, the liquid air passes through the three valves in the reverse order, and a twelfth pipeline 472 connects the storage vessel 410 to the storage side three-way valve 469, through the pressure control valve 468 and through and out of the third outlet of the heat exchanger side three-way valve 467. The pressure control valve 468 can cause the liquid air to change into a two-phase fluid at 8.25 BarG and 105K.

A thirteenth pipeline 473 transports the two-phase and/or liquid air to the second or latent heat coolth store 411. A fourteenth pipeline 474 connects the second coolth store 411 to the first coolth store 407 and transports the gaseous air at a pressure of 8.25 BarG and a temperature of around 106.5K exiting the second coolth store 411 to the first or sensible heat coolth store 407 where its temperature is increased to around 293K and its pressure reduced slightly to 8 BarG.

A fifteenth pipeline 475 connects the first coolth store 407 to the tank 452.

Alternatively, thirteenth pipeline 473 may join with ninth pipeline 464 and fourteenth pipeline 474 may join with eighth pipeline 463 as the coolth store may only have two connections. This is also the case with the previous embodiments.

It will be appreciated that the apparatus of the first to fourth embodiments may be used within the system depicted in the fifth embodiment.

Figure 11:
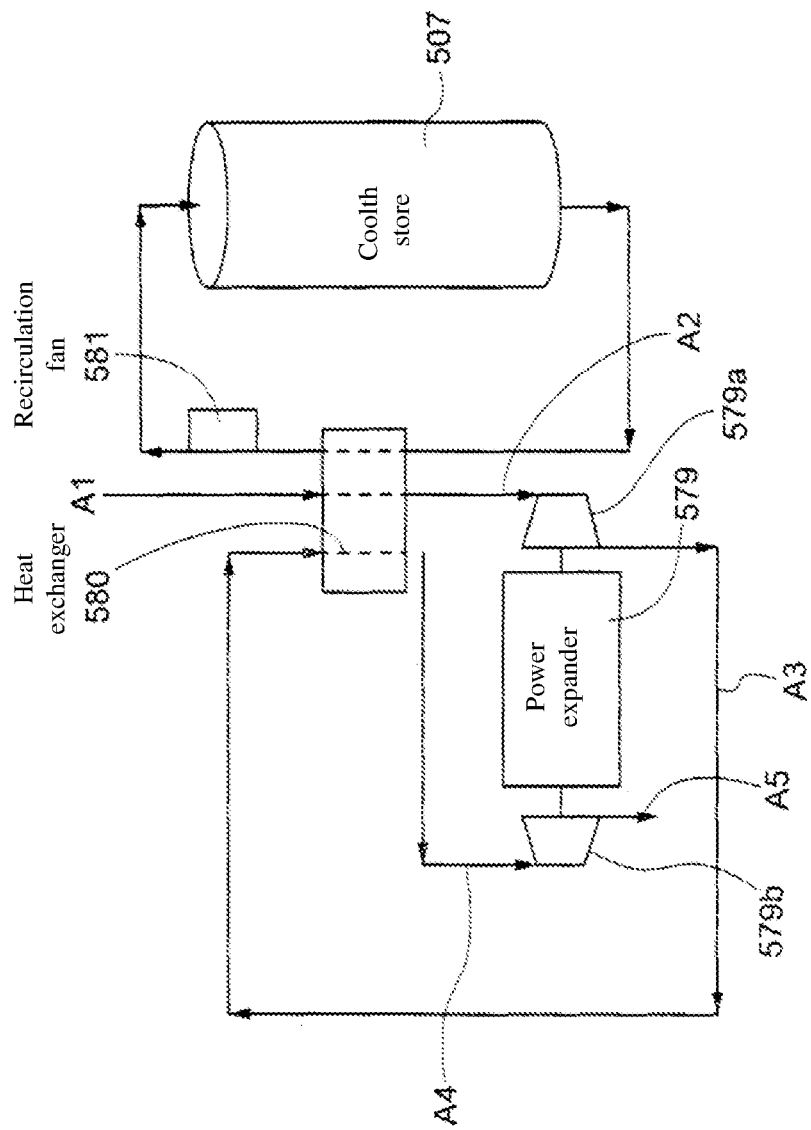
FIG. 11 is a diagrammatic representation of an energy generating apparatus according to the present invention.

FIG. 11 depicts an energy generating apparatus, specifically electricity generating apparatus involving the general apparatus and principles set forth in the previous gas storage apparatus embodiment. The energy generating apparatus is generally referred to as 500. Similarly functioning integers as the first four embodiment use a similar numbering scheme albeit prefixed with a "5" and, unless described in further detail below, their type and function may be inferred from the above description.

In essence, the output compressed air from any of the systems can be used in an expander/generator to output electrical energy. The gas can be heated before expansion by any means suitable, including the use of heat from waste heat, solar, geothermal or heat from the compressor(s) stored during the charging cycle. Heating can be applied to gas before any stage or stages of a multi-stage expansion system. The system may output shaft power rather than electrical power.

If no heating is applied to any expansion stage, the gas exiting the stage may be sub-ambient in temperature and be used directly or indirectly (via a heat exchanger) to provide refrigeration either to another process or as a coolth top-up device. Input gas to a stage could also be cooled from an outside source of refrigeration to act to reduce the temperature of that refrigeration process.

Heated and non-heated or cooled expansion stages can be mixed in a single system.

Compressed air A1 at 300K and 8.5 BarA is transported through a three-way heat exchanger 580.

The compressed air A1 is provided from the one of the above embodiments operating in the gas "discharge" mode.

A power expander 579, and specifically high pressure side 579a, is fed by the air A2 (8.4 BarA @ 420K) exiting from the three-way heat exchanger 580. This is used to generate electricity.

Air A3 (333K @ 2.9 BarA) exiting this side of the power expander 579 is then fed back through the three-way heat exchanger 580 exiting as air A4 (420K @ 2.8 BarA) before being fed through a low pressure side 479b of the power expander 579 to convert more of the Q of the air to electricity.

Air A5 may then be vented to ambient, being around 327K and 1 BarA.

A recirculation fan 581 may be used to cycle fluid from the first coolth store through the three-way heat exchanger 480.

Heat transfer may then take place between that fluid and the gaseous air phases passing through the heat exchanger.

It will be appreciated that the second, third, fourth and fifth embodiments include sub-cooling of the liquid air from the second coolth store, using the second heat exchanger. The purpose of the sub cooling is:
1) Reduce the temperature of the liquid air to a level where no flash gas is produced when the liquid air is reduced to the pressure required during storage. It is useful to avoid this flash gas production as it will have an increased concentration of oxygen above atmospheric air due to the slightly higher volatility of Oxygen over Nitrogen. If Oxygen levels exceed a certain limit then equipment costs and permitting costs rise dramatically. The avoidance of flash gas also means no separator is required.
2) The sub-cooling part of the process is also a convenient place to put the coolth top up.
3) Sub-cooling is efficient as it will again provide a close match between the temperatures of the coolth provision and use. Sub-cooling can be provided by many types of refrigeration equipment. The use of a compander is potentially advantageous as it will use the existing booster compressor to power it.

The power from the turbine can be used to recompress the expanded air after heat exchange with the liquid air and recuperation—this will reduce the turbine output pressure and therefore temperature to increase the delta t of the heat exchange process. Another cooling method would be to flash a portion of the liquid air to the inlet pressure of the booster and use this to cool the main part of the liquid air. Though both of the above processes would result in some concentration of oxygen in the vapour portion, both the liquid and vapour parts would remain in contact with each other so the Class 1 regulations for increased O2 concentrations would presumably not apply.

Most potential PCMs at these low temperatures will be combustible. It may be advantageous to keep compressed air away from a combustible material—the use of a heat pipe heat exchanger between the compressed air and the PCM with a non-combustible fluid (e.g. Nitrogen) appears to be a good option. A potential difficulty may arise due to the bi-directional heat transfer—heat pipes aren't generally designed for this. As the rate of heat exchange during charging and discharging will be significantly different, it may be possible to use a heat pipe with an upper and lower heat exchanger with the air, the lower heat exchanger being relatively smaller due its reduced duty. The level of the heat exchanger fluid will need to be close to the PCM material to ensure that a sump isn't formed, preventing operation of the heat pipe.

The efficient operation of a heat pipe can be compromised if the wall thickness is too great. Though the tubes are likely to be relatively narrow bore and therefore the wall thickness will not be excessive, it may be advantageous to have all the heat pipes in communication with each other to allow a common pressure relief valve to be used. In this way, the wall thickness can be appropriate for normal operation only, it will not be necessary to make this sufficient for a system failure resulting in the temperature rising to ambient and the pressure in the heat pipe rising to very high values.

In this instance the pressure relief valve will allow the pressure to remain within the structural capabilities of the heat pipe walls. One advantage of the heat pipe is that if one heat pipe ruptures, the other will continue to operate. Though this modification will remove this benefit, it may actually be beneficial as a single rupture could result in the heat pipe filling with PCM and then there would only be a single wall thickness between the PCM and the compressed air, which would not be ideal. The modification will cause the heat pipe fluid to vent into the PCM, causing the failure of the heat pipe to function and an increase in pressure of the PCM tank. Provided the head space in the PCM tank is sufficient, this tank can be designed to maintain structural integrity and contain the PCM and heat pipe fluid.

Although being described in relation to air, it will be appreciated that the apparatus and methods hereinbefore described may be applicable to a variety of gases/fluids.

The invention is not limited to the embodiments hereinbefore described but may be varied in construction and detail.

Although being described as a separate booster compressor and main compressor, it will be appreciated that this can be one single compressor with different stages that are loaded and unloaded appropriately.

It will be appreciated that the specific temperatures, flow-rates and pressures described hereinbefore are for illustrative purposes only and are non-limiting.

The invention claimed is:

1. An energy storage apparatus including at least one gas storage apparatus comprising a fluid inlet, a first coolth store, a second coolth store, a pressure reduction valve, and at least one storage chamber, wherein the fluid inlet is connected to the first coolth store, and fluid conduits connect the first coolth store to the second coolth store, and the second coolth store to the at least one storage chamber, the second coolth store augments the coolth storage of the first coolth store, the first coolth store is adapted for sensible heat, the second coolth store is adapted for latent heat, and wherein the gas is air and wherein there is provided one or more coolth top-up devices, wherein the apparatus has a charging pressure, a discharging pressure and a storage pressure, and wherein the charging pressure is above the discharging pressure and the storage pressure is between the charging and discharging pressures, and wherein the second coolth store is of a phase changing material type; and
wherein, the pressure reduction valve is located on a fluid supply line between a second heat exchanger and a fluid storage chamber.

2. The energy storage apparatus of claim 1 further including a multi-stage compression system having an inter-stage pressure similar or equal to the storage system gas output pressure and a compressor final stage output pressure similar or equal to the storage system gas input pressure during charging.

3. The energy storage apparatus of claim 1 wherein the first coolth store has a first coolth top-up device, the second coolth store has a second coolth top-up device, the first coolth top-up device includes a turbine, the first coolth top-up device includes an expander, the second coolth top-up device includes a turbine, the second coolth top-up device includes an expander, the gas storage chamber is a pressure vessel which stores the fluid as a liquid, wherein the fluid exiting the first and/or second coolth store is directed through a sub-cooling device, the fluid exiting the first and/or second coolth device is directed through a compander, the fluid inlet branches into a bypass fluid circuit, wherein the apparatus further includes a first heat exchanger, the bypass fluid circuit is connected to a first side of the first heat exchanger, a storage fluid line running from the first and/or second coolth and terminating at the gas storage chamber, the apparatus further including a second heat exchanger and wherein the storage fluid line is connected to a first side of the second heat exchanger.

4. The energy storage apparatus of claim 3 further including a third heat exchanger.

5. The energy storage apparatus of claim 4 wherein the third heat exchanger has three sides.

6. The energy storage apparatus of claim 4 wherein pressurised gaseous air is fed through a first side of the third heat exchanger.

7. The energy storage apparatus of claim 6 wherein fluid from the first coolth store is directed through a second side of the third heat exchanger.

8. The energy storage apparatus of claim 3 wherein the coolth bypass branch conduit connects to the second side of the first heat exchanger.

9. The energy storage apparatus of claim 8 wherein an expander is provided on the coolth bypass branch conduit.

10. The energy storage apparatus of claim 3 further including a first heat exchanger first side exit line extending from the first side of the first heat exchanger which is connected to the compander.

11. The energy storage apparatus of claim 3 wherein a second heat exchanger outlet line exits the second side of the second heat exchanger and is connected to the second side of the first heat exchanger line.

12. The energy storage apparatus of claim 11 further including a Joule-Thomson valve provided on the second side second heat exchanger line.

13. The energy storage apparatus of claim 12 wherein the second side heat exchanger line is fed from the storage fluid line.

14. The energy storage apparatus of claim 13 wherein the compression system comprises a single, multi-stage compressor.

15. The energy storage apparatus of claim 1 further including a power expander.

16. The energy storage apparatus of claim 15 wherein the power expander has two or more expansion stages.

17. The energy storage apparatus of claim 15 wherein a pressurised gaseous air is fed through a high-pressure side of the power expander.

18. The energy storage apparatus of claim 17 wherein lower pressure gas exiting the high-pressure side of the power expander is directed through a third side of the third heat exchanger.

19. The energy storage apparatus of claim 15 wherein lower pressure gas may be directed through a low-pressure side of the power expander.

20. A method of storing energy using an apparatus comprising the steps of:
raising pressure of a gas to a first pressure and being at a first temperature;
passing the gas through a first coolth store, wherein passing the gas through the first coolth store includes redirecting a portion of the gas prior to entry into the first coolth store into a first side of a first heat exchanger;
passing the gas from the first coolth store through a second coolth store;
passing the gas from the second coolth store into a storage chamber; and
wherein the output gas from the first side of the first heat exchanger is expanded into a two-phase fluid which is then passed through a second side of a second heat exchanger.

21. The method of claim 20 further comprising the step of mixing output gas from the first side of the first heat exchanger with the gas passing from the first coolth store to the second coolth store.

22. The method of claim 20 further including the step of passing the two-phase fluid exiting the second heat exchanger into a second side of the first heat exchanger.

23. The method of claim 20 further including the steps of:
passing the fluid exiting the second coolth through a first side of the second heat exchanger; and
passing the fluid through a pressure reducing valve after exiting the second heat exchanger.

* * * * *